Sept. 14, 1943.   S. A. SCHERBATSKOY   2,329,558
AUTOMATIC VOLUME CONTROL
Filed Sept. 7, 1937

INVENTOR
Serge A. Scherbatskoy.

Patented Sept. 14, 1943

2,329,558

UNITED STATES PATENT OFFICE 2,329,558

AUTOMATIC VOLUME CONTROL

Serge Alexander Scherbatskoy, Tulsa, Okla., assignor to Engineering Laboratories, Inc., Tulsa, Okla., a corporation of Oklahoma Application September 7, 1937, Serial No. 162,731

1 Claim. (Cl. 178—44)

My invention relates broadly to signal producing or transmitting systems and particularly to circuits for controlling the volume range in such systems.

One object of my invention consists in improving seismic recording systems used in geophysical prospecting and to vary automatically the sensitivity of the system so as to produce a legible record of the earth vibration on a strip of paper of limited width.

Another object of my invention is to provide an automatic volume control system with a variable loss device that shall be of the "unbalanced type" and shall be controlled in an improved manner to maintain the volume of the output energy in a predetermined range.

A further object of my invention is to combine the first and second of the above referred to objects and to provide a seismic recording system with an automatically controlled sensitivity and including a variable loss device of the unbalanced type.

Further objects appear in the specification and in the claim.

In the prior are of seismic prospecting considerable inconvenience was encountered in registering the wide amplitude range of earth vibrations on a strip of paper of limited width. One of the earliest efforts towards obviating this inconvenience resulted in an arrangement operated by a switch by means of which the recording system was made inoperative until after the first and very violent vibrations had passed beyond the receiving point. (See U. S. Patent 2,003,780, issued to William T. Born, June 4, 1935.) A further step in the direction of improving the seismic recording consisted in an arrangement for continuously varying the sensitivity of the recorder by means of an appropriate mechanical arrangement. (See U. S. Patent application of William G. Green, Serial #81,482, filed May 23, 1936.) A still further step has been subsequently made which consists in substituting the mechanical arrangement for continuously varying the sensitivity by an electrical arrangement. (See U. S. Patent application of Serge A. Scherbatskoy, Serial #100,841, filed September 15, 1936.)

The present invention constitutes a further improvement upon the prior methods and provides an electrical method of continuously and automatically varying the sensitivity of the seismic recorder.

An additional novelty of the present invention consists in the provision of a variable loss device of an "unbalanced type," whereas the variable loss devices of the prior art have been of the "balanced type." The reason for the distinction between the balanced and unbalanced arrangements may be seen by considering that electrical circuits may be used in two ways, viz: (1) with currents set along two wires symmetrically disposed with respect to ground, or (2) with currents sent through a "grounded circuit," a wire being used for one conductor and a "ground" path for the other. Accordingly: "A circuit, all of whose impedances are symmetrically disposed with respect to objects at ground potential, is called a balanced circuit" and "A circuit which has an impedanceless path on one side for the flow of currents is called an unbalanced circuit." (See T. E. Shea, Transmission Networks and Wave Flters, D. Van Nostrand Company, New York, N. Y., 1929, p. 58–60.)

It is well known to those skilled in the art that in a cascade arrangement of several balanced circuits all the elements are symmetrically disposed with respect to a common ground terminal and a cascade arrangement of unbalanced networks a common ground path can be used as a return conductor. If, however, an unbalanced network is intended to work in cascade with a balanced network, certain design difficulties present themselves due to the different arrangement of the circuit elements with respect to ground in balanced and unbalanced networks. These difficulties are usually overcome by providing a transformer coupling between a balanced and unbalanced circuit. It is noted, however, that the provision of a transformer coupling complicates the design and renders it less economical.

In the conventional voice frequency automatic volume control systems commonly used in the prior art the variable loss device consisted of a push-pull arrangement and therefore of a balanced network, while the networks preceding and following the variable loss device were of the unbalanced type. Consequently a transformer coupling usually has been provided between the variable loss device, and its preceding and its following stages.

In accordance with my invention I am providing a variable loss device of an unbalanced type and therefore I am able to provide an efficient cascade arrangement between the variable loss device and its preceding and its following stages because the said preceding and following stages are equally of an unbalanced type.

The objects and advantages of my invention will be clear from the following detailed description tion thereof when read in connection with the accompanying drawing in which.

Figure 1:
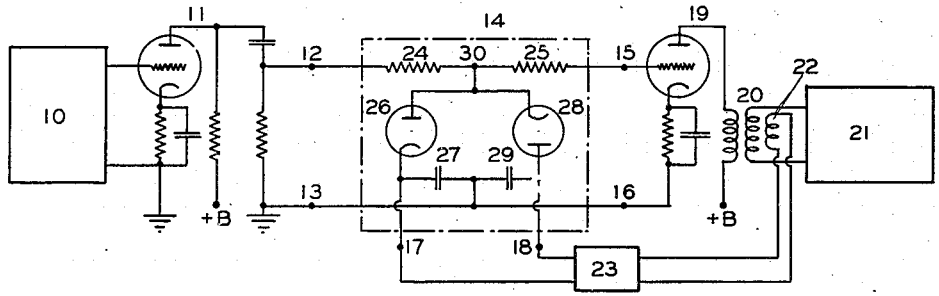
Figure 1 represents a system registering the earth vibrations and employing an automatic volume control arrangement of the "backward acting type."

Referring now more particularly to Figure 1, numeral 10 represents a geophone used for converting the earth vibrations into corresponding electrical vibrations. The output of the geophone is amplified in the electronic amplifier 11 and is subsequently applied across the input terminals 12, 13 of the variable loss device contained in the block 14. The variable loss device is inserted for volume control purposes and is provided with input terminals 12, 13, output terminals 15, 16 and control terminals 17, 18. The output of the variable loss device is amplified in the electronic amplifier 19 and is subsequently transmitted through the transformer 20 to the recorder 21. The transformer 20 is provided with a tertiary winding 22, the output of which is rectified in 23 and then applied to the control terminals 17, 18 of the variable loss device 14.

The recorder 21 contains a galvanometer which is adapted to respond to the electrical signal delivered by the amplifier 19 and causes a beam of light to produce a photographic record on a moving film, as is well known in the art. The moving film is driven at a uniform speed by a rotating drum or other device and produces a record of the motion of the geophone.

In the commonly used seismographic system in the geophysical prospecting art, six or eight geophones are simultaneously employed, and the outputs of these geophones are registered in a single recording unit adapted to produce six or eight records on a single strip of paper. In the arrangement of Figure 1 only one geophone is shown for the sake of simplicity.

The variable loss device 14 has a T structure in which the series arms consist of two high resistances 24 and 25, and the shunt arm includes two circuits in parallel, one of the said circuits consisting of non-linear resistance 26 in series with a condenser 27 and the other circuit consisting of a non-linear resistance 28 in series with a condenser 29. In my preferred embodiment I have chosen for the non-linear resistance a two electrode thermionic tube. The anode of the tube 26 has a common terminal with the cathode of the tube 28, the said common terminal being connected to the resistors 24, 25. The cathode of 26 and the anode of 28 are respectively connected to the control terminals 17, 18 of the variable loss device.

The operation of the above circuit is as follows:

The earth vibrations are translated into electrical vibrations by means of the geophone 10, the said electrical vibrations then being amplified in the electronic amplifier 11, and subsequently transmitted to the input terminals 12, 13 of the variable loss device 14. The purpose of the variable loss device is to absorb a certain amount of the energy of the vibrations and consequently to produce across the output terminals 15, 16, attenuated vibrations which will substantially resemble in form the vibrations applied across the input terminals 12, 13, but will be correspondingly reduced in volume in a predetermined manner. It is readily apparent that the effectiveness of the variable loss device, i. e., the amount of attenuation produced depends upon the impedance of the shunt arm inserted between the terminals 30 and the ground, and consequently, by controlling the impedance of the shunt arm, the amount of attenuation produced by the variable loss device can be readily controlled.

Accordingly I have provided an arrangement for controlling the impedance of the shunt arm by means of a voltage applied across the terminals 17, 18. The manner in which this voltage affects the shunt impedance is readily apparent from the drawing. Half of the control voltage is applied across the tube 26 and the other half is applied across the tube 28 (assuming that the tubes are identical). Both tubes possess a non-linear voltage current characteristic and consequently each of them will have a resistance $r$ which will depend upon the voltage across the terminals 17, 18. If C is the capacitance of 27 or 29 then the impedance of a branch consisting of the tube 26 is in series with the capacitor 27 or the impedance of the branch consisting of the tube 28 in series with the capacitance 29 can be represented operationally as $$r + \frac{1}{pC}$$

$\left(\text{where } p \text{ denoted the operator } \frac{d}{dt}\right)$

Consequently, the total impedance of the shunt circuit of the variable loss device can be represented as $$\frac{1}{2}\left(r + \frac{1}{pC}\right)$$

The attenuated vibrations derived from the output terminals 15, 16 of the variable loss device are amplified in 19 and recorded in 21.

The voltage applied to the control terminals 17, 18 of the variable loss device has been derived from the tertiary winding 22 of the transformer 20 and rectified in 23. The circuit is therefore similar to the one designated in telephone engineering as the backward acting type (see "The Compandor—An Aid Against Static in Radio Telephony," by R. C. Mathes and S. B. Wright, The Bell System Technical Journal, July, 1934, volume XIII, #3, pp. 315–322), i. e., the control energy is taken from the line behind the variable loss device.

It is readily apparent to those skilled in the art that if the level of vibrations applied to the recorder 21 increases beyond a predetermined range the voltage derived from the tertiary winding 22 of the transformer 20 and consequently the rectified voltage applied across the control terminals 17, 18 increases. Then the impedance of the shunt arm in the variable loss device changes in such a manner as to increase the amount of energy dissipated and consequently to produce a more effective attenuation. Then the output derived from the terminals 15, 16 will be decreased in volume, and will tend to regain the predetermined range.

Figure 2:
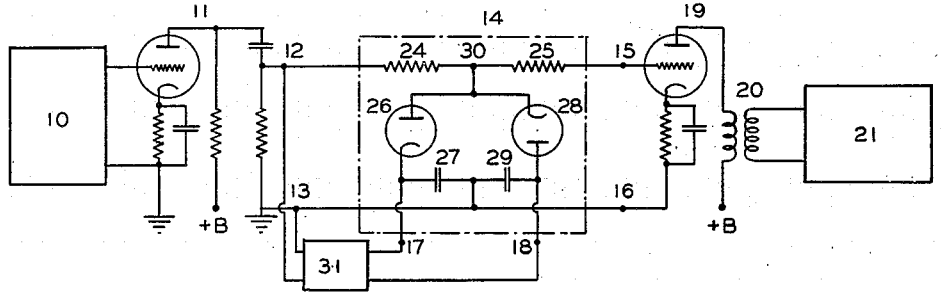
Figure 2 represents a system of the "forward acting type."

Figure 2 represents a modification of my invention in which the automatic volume control system is of the forward acting type. Accordingly, the control voltage applied to the control terminals 17, 18 of the variable loss device 14 has been derived from the terminals 12, 13, i. e., from the terminals which precede the variable loss device and rectified in the rectifier 31. It is apparent that if the level of vibrations derived from the terminals 12, 13 increases the output voltage of the rectifier 31 applied across the terminals 17, 18 increases. Then the impedance of the shunt arm in the variable loss device changes in such a manner as to increase the amount of energy dissipated and consequently to produce a more effective attenuation. Then the output derived from the terminals 16, 15 will decrease in volume and will tend to regain the predetermined range.

Figure 3:
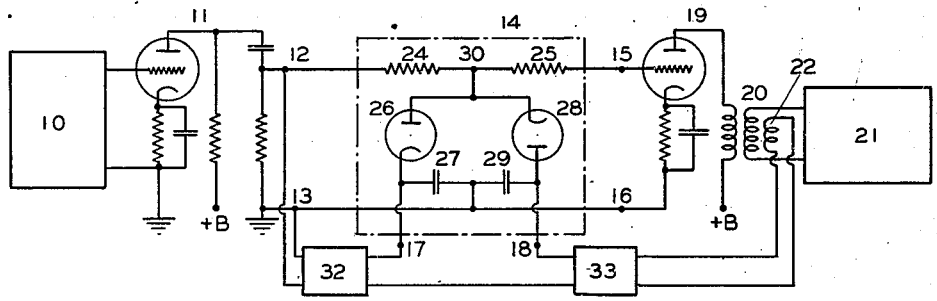
Figure 3 represents a system which is a combination of the arrangements of Figure 1 and Figure 2.

Figure 3 represents another modification of my invention in which the automatic volume control system is a combination of the systems shown in Figure 1 and Figure 2. Accordingly, the control voltage applied to the control terminals 17, 18 of the variable loss device 14 has been partly derived from the terminals 12, 13 and partly derived from the tertiary winding 22 of the transformer 20. In particular, the voltage derived from the terminals 12, 13 has been rectified in the rectifier 32, the voltage derived from the winding 22 has been rectified in the rectifier 33; then the output voltages of the rectifiers 32, 33 are connected in series and applied to the control terminals 17, 18 of the variable loss device. It is apparent that this arrangement is a combination of a forward acting and a backward acting control because the voltage applied across the control terminals 17, 18 depends upon the voltage derived from the terminals 12, 13 which precede the variable loss device and the voltage derived from the winding 22 which follows the variable loss device.

In view of my invention and disclosure, variations and modifications to meet individual whim or particular need will doubtless become evident to others skilled in the art, to obtain all or part of the benefits of my invention without copying the structure shown and, I therefore claim all such insofar as they fall within the reasonable spirit and scope of my invention.

I claim:

In an automatic volume control system a non-linear resistance in series with a condenser connected across the signal channel, another non-linear resistance in series with another condenser across the said signal channel in opposition to said first resistance and condenser and means for applying a control voltage across the non-linear resistances according to the volume of the signal.

SERGE A. SCHERBATSKOY.